United States Patent [19]

Jessen

[11] Patent Number: 5,333,795
[45] Date of Patent: Aug. 2, 1994

[54] GRANULAR AND LIQUID TREATMENT MATERIAL SPREADER

[76] Inventor: Thomas F. Jessen, 855 W. Harrison Blvd., Valparaiso, Ind. 46384

[21] Appl. No.: 140,674

[22] Filed: Oct. 21, 1993

[51] Int. Cl.⁵ .......................... A01C 7/06; A01C 19/04
[52] U.S. Cl. .................................. 239/663; 239/157; 239/685; 239/687
[58] Field of Search ............... 239/685, 687, 663, 157, 239/156, 566, 565

[56] References Cited

U.S. PATENT DOCUMENTS

| | | | |
|---|---|---|---|
| 3,383,055 | 5/1968 | Speicher | 239/687 |
| 3,394,892 | 7/1968 | Speicher | 239/687 |
| 4,185,782 | 1/1980 | Belrose | 239/663 |
| 4,234,131 | 11/1980 | Baker | 239/685 |
| 4,296,875 | 10/1981 | Borglum | 222/632 |
| 4,352,463 | 10/1982 | Baker | 239/663 |
| 4,483,486 | 11/1984 | Magda | 239/157 |
| 4,511,090 | 4/1985 | Morgan | 239/666 |
| 4,798,325 | 1/1989 | Block | 239/156 |
| 4,901,655 | 2/1990 | Magda | 111/8 |
| 4,926,768 | 5/1990 | Magda | 111/11 |
| 4,955,538 | 9/1990 | Laube et al. | 239/663 |

Primary Examiner—Andres Kashnikow
Assistant Examiner—Christopher G. Trainor
Attorney, Agent, or Firm—Roper & Quigg

[57] ABSTRACT

The present invention provides an apparatus for spreading on the ground granular and liquid treatment materials at the selection of the operator. The apparatus includes a motorized cart having granular and liquid storage compartments and associated controls to release the treatment materials on an as needed basis. A spray wand is also provided to permit spraying the liquid material for detail applications. A pump is operably connected to the liquid storage compartment, the spray wand, and one or more area spray nozzles to provide the liquid for spraying purposes. The granular material can be radially broadcast from the granular storage compartment as the cart traverses the ground. Controls for the motor and the granular and liquid treatment operation are mounted to the apparatus for easy access by the operator. The present invention also provides a retrofit package for inclusion on available granular spreaders to provide the motorized granular and liquid treatment apparatus disclosed herein.

25 Claims, 3 Drawing Sheets

GRANULAR AND LIQUID TREATMENT MATERIAL SPREADER

BACKGROUND OF THE INVENTION

The present invention relates to apparatus to spread known granular and liquid treatment materials. The apparatus is particularly useful in the lawn and garden environments to spread granular and liquid fertilizers, herbicides, insecticides, fungicides and the like to enhance and control plant growth.

Proper treatment and maintenance of soils, lawns, gardens and the like must be periodically performed in order to enhance and control plant growth. For example, many homeowners know that lawn maintenance can be a long and difficult project. Lawn maintenance can vary widely depending on such factors as terrain characteristics, climate, and the amount and type of previous care given to the lawn. However, proper lawn maintenance should include the application of various types of seed, fertilizers, insecticides, herbicides, fungicides, and other such materials depending on the condition of the lawn be treated and the desired treatment outcome. These materials are typically available as solid granular materials or liquid solutions.

Prior to the present invention to be described herein, separate compact hand operated apparatus for the treatment of a lawn with either liquid or granular material were known. With these systems, the lawn is first treated with one type of material using one hand operated apparatus, and subsequently treated with the second material using another hand operated apparatus. Use of these separate systems results in a duplication of time and labor at an increased cost. Also, duplication of operator efforts using such systems adds substantially to the fatigue experienced by the operator.

One prior device is shown in U.S. Pat. No. 4,511,090 which describes a rotary spreader where material is deposited on a rotary disc and is broadcast upon rotation of the disc as the spreader is manually pushed. This spreader includes a deflector used with the rotating disc. The deflector functions to intercept the material broadcast by the disc, which material would normally be directed to one side of the spreader, and redirect that material to the other side of the spreader. Because this device can only spread granular material, other devices must be used to apply the liquid treatment material. This results in duplication of operator efforts and requires the operator to have two different devices available, thus increasing the operator's overall costs.

Another prior device is shown in U.S. Pat. No. 4,483,486. That device is said to be capable of both spreading granular material and spraying a liquid; however, this device is hand operated, and the operator must manually push the apparatus over the lawn area. Because the apparatus carries not only granular treatment material but also liquid treatment material, it is substantially heavier in use than the typical spreader carrying one or the other material. Thus, when fully loaded it is more difficult to overcome the device's rolling resistance. Moreover, this device requires that it be moving in order for the liquid material to be sprayed. Further, the device disclosed in this patent provides the capability of spraying the liquid material only to relatively wide open turf areas. However, typical lawn areas are interspersed and surrounded by ornamental plantings, gardens, overhanging shrubs, and the like, which could be damaged by contact with certain liquid treatment materials. To avoid damage to these areas, the operator of this known apparatus must avoid spraying too close. However, gaps in spray coverage can result in unacceptable imperfections in the turf. Consequently, the operator must transverse the lawn area a second time with a hand operated sprayer to perform the close-in detailed trimming. This, of course, can substantially increase time, labor, cost, and operator fatigue associated with tending such areas.

A further prior device is shown in U.S. Pat. No. 4,352,463. That patent describes a motor driven lawn treatment spreader that contains means for spreading dry materials. The device is also equipped with a hose connection that enables it to be connected via a hose to a source of liquid material carried on a stand-alone vehicle, such as a truck or van. The truck or van carries a pump that pumps the liquid material through the hose to the spreader. Thus, while this device has the capability of applying both dry and liquid treatment materials, it requires a separate truck or van as the carrying source of the liquid material and a hose of sufficient length to permit ready application of the liquid. Because the device pulls the hose (and the liquid carried therethrough), it is possible that in certain uses the overall weight of the hose and the liquid carried therein will exceed the pulling power of the motor driven spreader. In addition, pulling the hose along a lawn may result in damage to ornamental plantings, and the like, unless care is taken during use. Furthermore, this device is propelled via a chain and sprocket assembly operating in conjunction with the motor. Such arrangement may be susceptible to detrimental wear when pulling the liquid-carrying hose.

It is apparent from the aforementioned prior devices, which are typical of the lawn spreader art, that none of the disclosed compact or hand operated spreaders or sprayers, or combined spreader-sprayers fully eliminates the duplication of work which must be performed by the operator of such devices.

That is, since each of the prior single function carts performs only a single operation an operator must first treat a lawn with either only a liquid or granular type material, and subsequently repeat the treatment with the other type of material. This duplicative two-stage lawn treatment procedure is obviously time consuming and expensive. Moreover, because the device described in U.S. Pat. No. 4,483,486 performs only wide area application of liquid and granular products, an operator must subsequently repeat the treatment of the liquid product in narrow turf areas and around susceptible ornamental plantings. This duplicative two-stage lawn treatment procedure is, again, time consuming and expensive. Further, from the disclosed art in U.S. Pat. No. 4,483,486 describing the multi-function cart, it is impossible to operate a hand-held narrow area spray nozzle from a stationary position even if so equipped due to the fact that the above-mentioned cart must be in motion to pump the liquid. The stationary trimming feature is most advantageous where precision work is required of the operator and movement would interfere with the precise placement of the liquid product.

In addition, it is apparent from the disclosed art covering manually operated compact walk-behind spreaders, sprayers, or combination spreader-sprayers that none of the disclosed compact or hand-operated spreaders, or sprayers, or spreader-sprayers eliminates the operator fatigue caused by the exertion required to manually propel the devices. That is, because the disclosed carts requires an operator to push them, the lawn treatment procedure or procedures are obviously fatiguing.

In any event, as evident from the foregoing, there is no suggestion in the known compact hand operated lawn treatment art to provide a self-contained, self-propelled spreader capable of both spreading granular material and spraying liquid material to wide areas of the lawn and spraying liquid material to narrow trim areas of the lawn while on the move or from a stationary position.

The present invention overcomes these and other disadvantages by providing a compact self-contained, self-propelled walk behind lawn treatment apparatus which enables its operator selectively to spread granular material to wide areas of the lawn, to spray liquid material to wide areas of the lawn, to spray liquid to narrow areas of the lawn, and to simultaneously perform any two or more of these functions. The present invention is designed to eliminate the duplication of steps now required to spread granular and liquid materials to all areas of the lawn using a walk behind spreader, and to reduce the physical exertion required to operate a compact walk behind spreader.

In a further aspect of the present invention, a number of commercially available compact hand operated granular spreaders can be readily retrofitted to provide the self-propelled and spray features of the present invention.

SUMMARY OF THE INVENTION

The present invention provides a lawn and garden care apparatus that can be used to spread granular treatment materials to wide areas, spray liquid treatment materials to wide or narrow areas, at the discretion of the operator, while moving forward or from a stationary position. The apparatus can also be used to perform simultaneously any two or more of these treatment approaches. The spreader is compact, intended to be walked behind, and includes a motor, a motor controller, a transmission, and drive wheels. Moreover, the spreader includes a bin or bins for accommodating granular treatment material, and a dispenser to dispense the material on the lawn to be treated. At least one tank of liquid treatment material is provided. Hoses, which define a fluid flow path, connect the liquid tank to one or more chassis mounted wide area spray nozzles and to a hand operated narrow area spray nozzle. Valves are positioned in communication with the hoses which enable the operator to selectively cause fluid contained within the hose to flow through the wide area spray nozzles or the narrow area spray nozzle, or both. A peristaltic pump is operatively associated with the hoses and drive wheels to provide flow to the respective spray nozzles when the drive wheels are turning and the respective valves are actuated.

In an alternative embodiment, the present invention can also be used in association with known hand operated spreaders having only granular spreading capabilities by ready retrofit. Likewise, the present invention can also be used in association with known hand operated spreaders which have granular and liquid capabilities by ready retrofit.

DESCRIPTION OF THE PREFERRED EMBODIMENT

Figure 1:
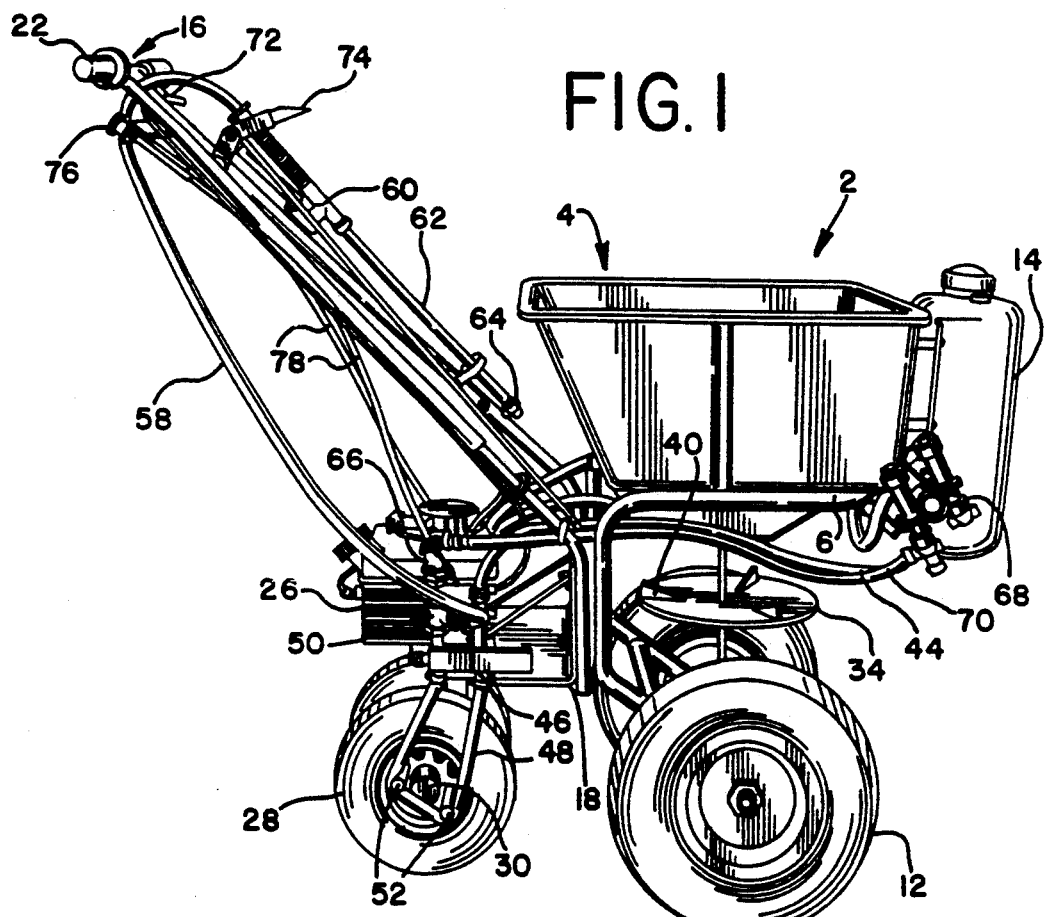
FIG. 1 illustrates a perspective side view of one embodiment of the apparatus of the present invention.

Turning now to FIG. 1, one embodiment of the apparatus of the present invention is generally illustrated by reference numeral 2. The apparatus there shown includes a granular storage compartment 4 having an opening on the top thereof and having a bottom portion with a sloped, or trough, shape to ensure that granular material contained in the compartment will readily fall by gravity to the bottom of the compartment. The compartment 4 may also be fitted with a hinged or removable lid (not shown) to cover the top of the compartment.

The compartment 4 is attached to chassis frame 6 which may be, for example, tubular metal bent in the form of a one-piece frame. In such configuration, the frame 6 may be bolted, screwed, welded, or otherwise affixed, near the bottom portion of the compartment 4. On the other hand, the frame 6 may simply be a plate affixed to the bottom of the compartment 4. Other forms of the chassis frame are contemplated herein. Irrespective of the exact configuration of the frame 6, frame 6 has an opening therein that allows granular material in the compartment 4 to pass therethrough.

Frame 6, as shown in FIG. 1, is also provided with extension hubs 8 (see FIG. 4) through which an axle 10 (see FIG. 4) is positioned. Axle 10 is connected, at each end thereof, to wheels 12.

A liquid tank 14 is also attached adjacent to the compartment 4. The tank 14, which may be made from, for example, metal or plastic, can be abutted-against the compartment 4 or may be off-set therefrom. In the latter situation, the tank 14 may be connected to an extension of frame 6 (not shown in FIG. 1) for purposes hereinafter described.

The frame 6 is connected, as by bolts, screws, welds, and the like, to handle 16 and mounting bracket 18. Handle 16 includes extensions 20 (see FIG. 4) and grips 22; support bars (not shown) may connect each extension 20 to provide a degree of rigidity to, and reduce the torque of, handle 16.

The mounting bracket 18 has affixed thereto a motor 26. The motor 26 may be fuel or electric powered; if electric powered, provision is made on bracket 18 for carrying one or more batteries connected to motor 26. Alternatively, if motor 26 is fuel powered, such as a 2-stroke gasoline fueled engine, the motor will have an associated fuel reservoir, a starter and other mechanisms standard in the motor art.

Figure 2:
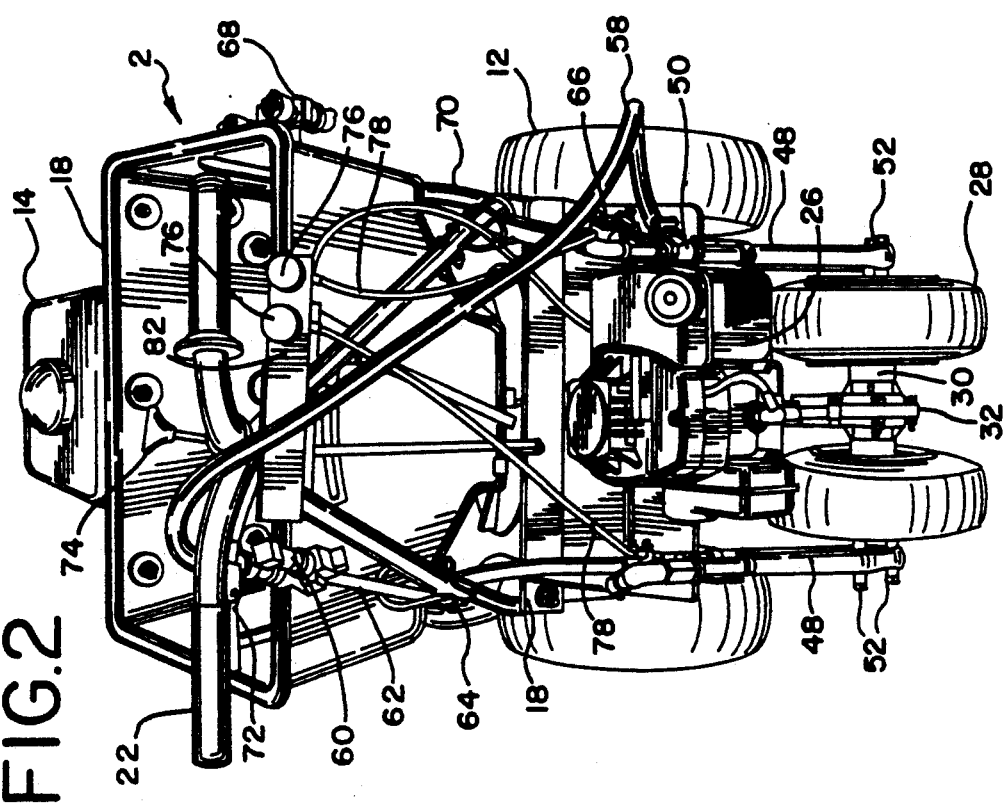
FIG. 2 illustrates a perspective rear view of one embodiment of the apparatus of the invention.

The apparatus 2 also includes drive wheels 28 connected via an axle 30 (see FIG. 2). The motor 26 is operatively connected to axle 30 of drive wheels 28 through a centrifugal clutch (not shown) and a transmission 32 (see FIG. 2).

Figure 4:
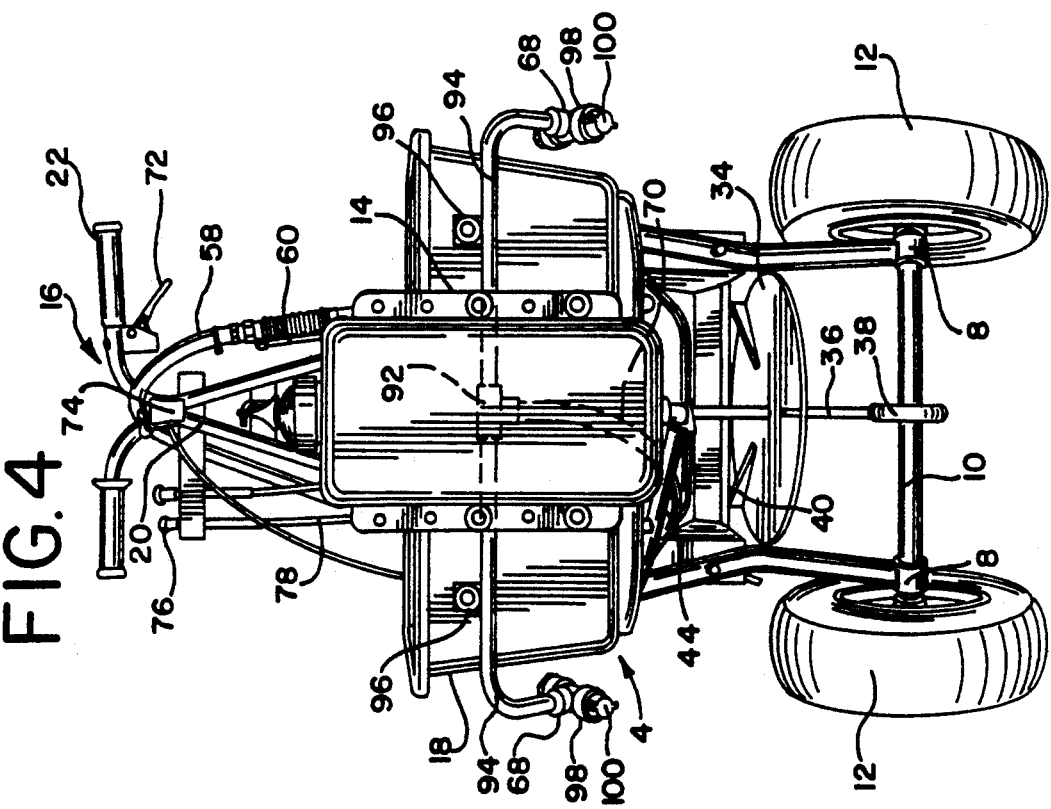
FIG. 4 illustrates a perspective front view of one embodiment of the apparatus of the invention.

With further reference to FIG. 1 and with reference to FIG. 4, a platter 34 is positioned between the bottom portion of compartment 4 and the axle 10 of wheels 12.

The rotatable platter, or disc, 34 is attached to a shaft 36 which in turn is connected to gearing arrangement 38 associated with the axle 10. The gearing arrangement 38 is such that rotational movement of the axle 10 causes the shaft 36 to turn and hence the platter 34 to spin in a plane generally parallel to the direction of travel of the wheels 12. The platter 34, which is provided with one or more ribs, or impeller blades, 40, is located below a hinged, slidable, or rotatable cover (not shown) associated with the bottom of the compartment 4. Thus, when the platter 34 is spinning, granular material falling from the compartment 4 through the cover, when it is in the open position, is thrown by the ribs 40 in an radially outward direction.

Referring back to FIG. 1, the apparatus 2 is also provided with a flexible supply hose 44, one end of which communicates through a connect/disconnect hose connector (not shown) with a lower portion of the liquid tank 14. The supply hose 44 may be attached to the exterior of the compartment 4 or to the frame 6, or both, as by clips and the like (not shown). The other end of the hose 44 is attached to a secured hose fitting inlet 46. Inlet 46 is in turn connected to one end of pump hose 48, the other end of pump hose 48 being attached to the inlet side of a manifold 50.

As shown in FIG. 1, the pump hose 48 is positioned around pump rollers 52; the rollers 52 are connected to drive wheels 28 radially outwardly from the central axis of the axle 30. The rollers 52 may be constructed from a metal shaft or tube having a rotatable sleeve (not shown) secured thereon. The rotatable sleeve may be provided with guides 53 positioned on each side of the pump hose 48 (see FIG. 3) to ensure that the pump hose 48 does not slip off the roller 52. Such arrangement allows the rollers 52 to ride over the surface of the pump hose 48 as the wheels 28 turn and thus impart a peristaltic action to the pump hose 48. This peristaltic action pumps liquid from the liquid tank 14 for purposes described hereinafter. In addition, the rotatable sleeve on the rollers 52 advantageously reduces friction and wear as the rollers 52 contact the pump hose 48 while still imparting the peristaltic pump action.

Figure 3:
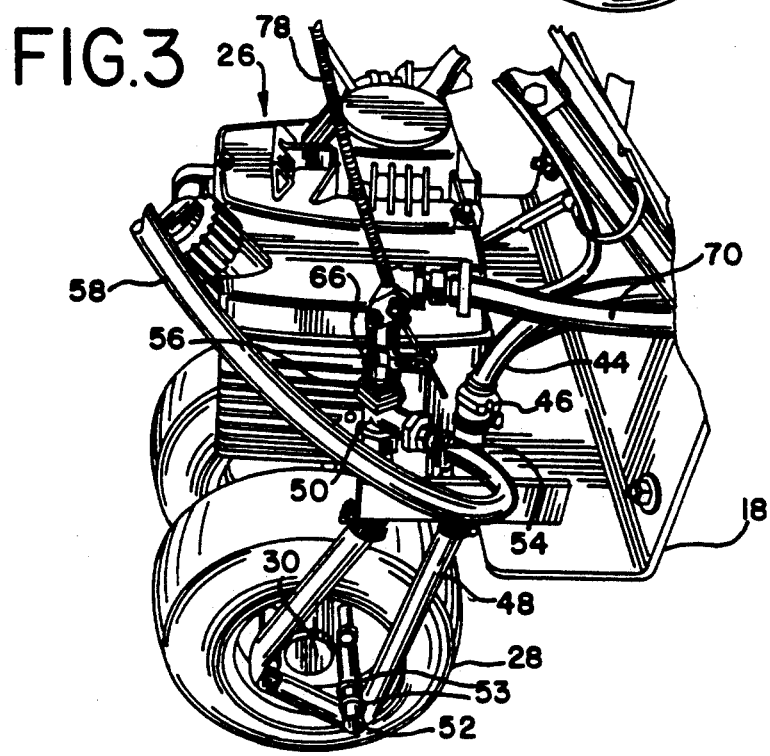
FIG. 3 illustrates one embodiment of the peristaltic pump arrangement of the present invention.

The manifold 50 is provided with a first outlet 54 and a second outlet 56 (see FIG. 3). The first outlet 54 communicates through flexible hose 58 to hand actuated valve 60 (see FIG. 2). The valve 60 is coupled to a spray wand 62 which in turn is coupled to spray discharge nozzle 64. The second outlet 56 of the manifold 50 communicates with a valve 66; the valve 66 communicates with spray nozzle 68 through outlet hose 70 (see FIG. 1). As seen in FIG. 1, two nozzles 68 are provided; in this regard, it will be apparent that the exact number of nozzles provided on each side of the apparatus 2 may vary with the intended use of the apparatus.

The handle 16 may carry certain controllers for use during the operation of the present invention. For example, the handle 16 may have motor controller 72 operably connected to the motor 26 to control the speed thereof. In addition, the handle 16 may include a granular control lever 74 operably connected, as by a push-pull cable (not shown), to the cover (not shown) associated with compartment 4 to cause the cover to be opened, thereby controlling release of the granular material from the compartment 4. One or more valve actuation controls 76 may also be located on the handle 16; the controls 76 are operably connected to valve 66 by one or more cables 78.

Figure 5:
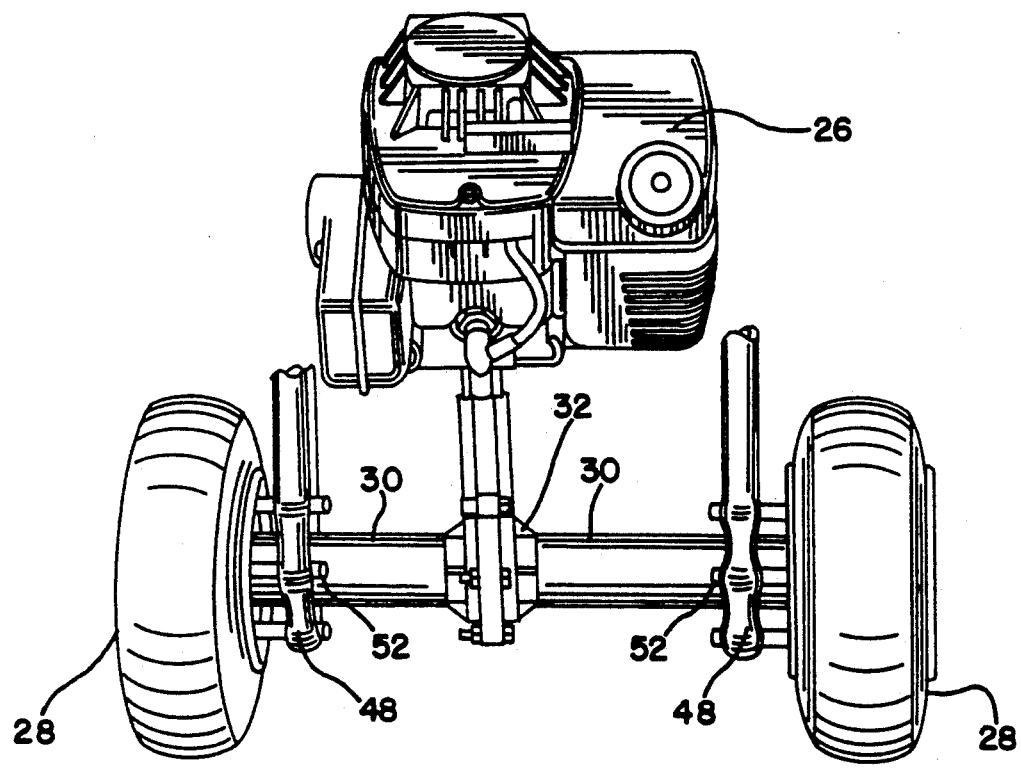
FIG. 5 illustrates an alternative embodiment of FIG. 3 showing two pumps.

FIG. 2 shows a rear perspective view of the apparatus 2 of the present invention. As there shown the pump rollers 52 are positioned on the outboard sides of the wheels 28. A plate (not shown) may be attached to the mounting bracket 18 to extend beyond the outward location of the pump rollers 52 to shield those rollers. An alternative embodiment is shown in FIG. 5 in which the pump rollers 52 are positioned on the inboard sides of the wheels 28. In this latter configuration, the length of the axle 30 is adjusted to ensure that there is adequate clearance for the pump hose 48 to be positioned around the pump rollers 52 without binding or crimping against the outermost sides of the motor 26.

As also shown in FIG. 2, the flexible hose 58 can be looped over the handle 16 for carry; a receiving clip (not shown) can also be placed on the handle 16 to secure the hose 58 when the latter is not in use. Preferably the hose 58 should be of such a length to allow the operator to use the spray wand 62 at some distance from the apparatus 2. Motor controller 72 and valve actuation control 76 could be located on bracket plate 82 attached to the handle 16; although not so shown in FIG. 2, granular control lever 74 may also be located on the plate 82.

Referring now to FIG. 3, a close-up perspective of a portion of FIG. 1 is shown. As noted in FIG. 3, the supply hose 44 is connected to the inlet 46; this connection may be made by hose barb fittings and clamps. One end of the pump hose 48 is also connected to the inlet 46. The other end of the pump hose 48 is connected to the inlet side of manifold 50. The manifold 50 may be a simple T-pipe configuration, with the first leg thereof attached to the pump hose 50, the first outlet 54 attached to the flexible hose 58 and the second outlet 56 attached to the valve 66. The valve 66, which is positioned in line with the second outlet 56, feeds to the outlet hose 70.

The arrangement shown in FIG. 3 provides several advantages to the present invention. For example, when the invention is in use, the drive wheels 28 are powered by motor 26. As the drive wheels 28 rotate, the pump rollers 52 and associated rotatable sleeves ride over the pump hose 48 to provide a peristaltic pumping action to the pump hose 48. Thus, liquid is withdrawn from the liquid tank 14 (see FIG. 1) and flowed through supply hose 44, inlet 46 and pump hose 48 to the manifold 50. If, during operation, the valve 66 is in the closed position, i.e., no liquid flows through the outlet hose 70 to the spray nozzle 68, the liquid will flow through the flexible hose 58 to the spray wand 62 to maintain a head of pressure in the hose 58 and wand 62. This ensures that the spray wand will be under pressure and ready for use during close-in liquid treatment applications.

In addition, the arrangement provides that when the valve 66 is in the open position, a portion of the liquid stream flowing through the manifold 50 will be diverted to the flexible hose 58 and the spray wand 62, again to maintain a head of pressure therein. Also, a portion of the liquid stream will flow through the outlet hose 70 and to the spray nozzle 68 and will maintain a head of pressure in the hose 70 until the nozzle 68 is opened for the spraying operation. Although the valve 66 is shown in FIGS. 1 and 3 as being separated from the manifold 50, it will be appreciated that valve 66 can also be integral to the manifold 50. In another embodiment, the nozzles 68 are of the automatic type and will open to discharge liquid upon the application of a head of pressure. Thus, when the valve 66 is closed, the spray wand will be under pressure, as described above, and the nozzles 68 will be in the closed position. When the valve 66 is thereafter opened, the nozzle 68 will deliver liquid without the operator first having to open manually the nozzles 68.

Figure 6:
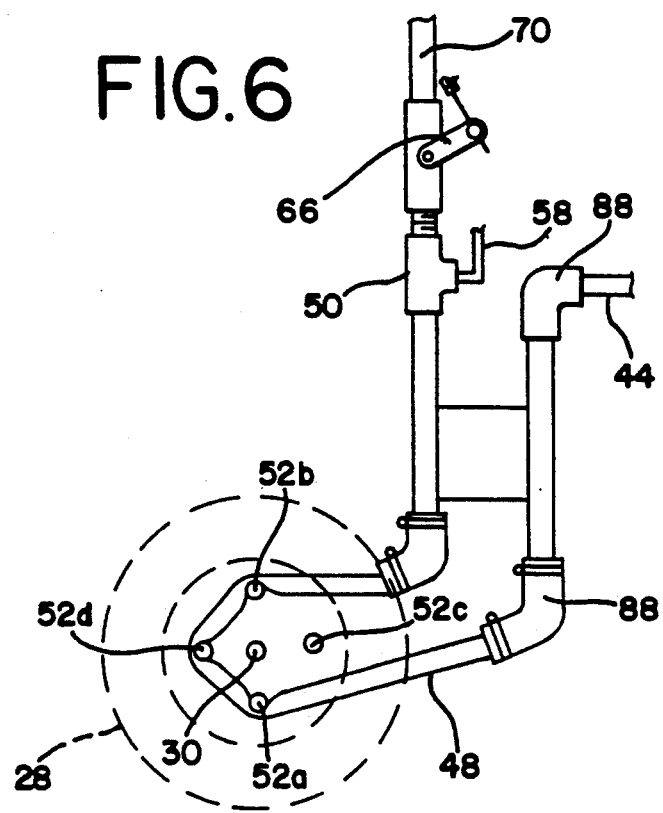
FIG. 6 shows an alternative embodiment of a portion of FIG. 3.

An alternative configuration to that shown in FIG. 3 is depicted in FIG. 6. As there shown, four pump rollers 52 (rotatable sleeves not shown) are provided on the drive wheel 28. These rollers 52 are in paired relationship (i.e., rollers 52a and 52b form one pair and rollers 52c and 52d form the other pair) and are offset radially from the axis of the drive wheel axle 30. (The wheel 28 is shown in dashed lines for clarity). Such arrangement also imparts peristaltic action to the pump hose 48 and has the advantage of providing a more even flow of liquid to the manifold 50 when compared to the configuration shown in FIGS. 1 and 3; that is, the FIG. 6 configuration provides less of a pulsating effect to the liquid. The configuration shown in FIG. 6 may be used in both the outboard arrangement of FIG. 1 or the inboard arrangement of FIG. 5.

Again referring to FIG. 6, it will be noted that angle couplings 88 may be provided to change direction of the hose 44 and the hose 70, as may be necessary. Such angle couplings may also be provided, as needed, in relation to the embodiment depicted in, for example, FIG. 1.

FIG. 4 depicts a front perspective view of the apparatus 2. As there noted, the outlet hose 70 communicates with spray nozzles 68 through valve 92. The valve 92 may be, for example, a simple T-splitter valve or may include mechanism to channel flow of the liquid to one side or the other or both of the apparatus. The valve 92 is connected to nozzles 68 via extension tubes 94. The tubes 94 may be fastened, as by bolts and screws, to compartment 4 via clips 96; alternatively, the tubes 94, if metal, can be welded to compartment 4. FIG. 4 shows that the valve 92 and portions of the tubes 94 are positioned between the front surface of the compartment 4 and the rear surface of the tank 14. In such arrangement, the compartment 4 and tank 14 may be in spaced-apart relation, with the tank being carried on an extension of frame 6, as described above in relation to FIG. 1. Alternatively, the tank 14 may have, on the rear surface thereof, an indent (not shown) in which the valve 92 and portions of the tubes 94 may rest. This latter configuration would allow the tank 14 to be abutted against the compartment 4.

As shown in FIG. 4, one spray nozzle 68 may be positioned on each side of the compartment 4. Each spray nozzle 68 may contain a check valve 98 to prevent dripping of the treatment liquid if the pressure in the hose 70 and tube 94 falls; the nozzle 68 also includes a spray head 100. Typically, each spray nozzle 68 is positionable on the end of the extension tube 68 so that the direction of spray from head 100 can be controlled. In this regard, it is advantageous to position the nozzle 68 outwardly and downward from the apparatus 2 so that each spray head 100 will form an arcuate spray pattern of about 110°, with the pattern being sprayed in a downward direction generally about 60° to about 90° from the direction of travel of the apparatus 2. However, because the spray nozzles 68 are positionable, the exact areal coverage of the spray emanating from the spray heads 100 can be adjusted according to need.

As noted in FIG. 4, two spray nozzles 68 are provided. In this configuration, each spray nozzle receives liquid from the tank 14 via the peristaltic action imparted to the pump hose 48. If it is desired to increase the volume of liquid flow to the nozzles 68, this can be accomplished by adding another line 70 and valve 92 in communication with the extension tube 94. For example, FIG. 2 depicts pump hoses 48, and associated supply hoses, pump inlets, manifolds, pump rollers, outlet hoses, and valve actuation controls, positioned on each of the drive wheels 28. In this configuration, each pump hose 48 will transmit treatment liquid to the tubes 94 and hence the nozzles 68.

Moreover, if it is desired to use two different types of treatment liquid, this can be accomplished easily by dividing the tank 14 into two separate chambers, with one chamber feeding to one of the spray nozzles 68 (or one set of nozzles 68 if multiple nozzles are provided on each side of apparatus 2) and the other chamber feeding to the second nozzle 68 (or to the second set of nozzles 68 if multiple nozzles are provided). Likewise, if it is desired to make provisions for two spray wands 62, this can be accompanied in the same manner and as also described above in relation to the wand 62 of FIG. 1. While these embodiments are not depicted in the drawings, one skilled in the art will readily appreciate their construction and mode of operation upon reading the entirety of this disclosure.

Thus, the apparatus of the invention described to this point can be broadly characterized as a motor driven granular and liquid treatment material spreader that can spread granular material only, spray liquid treatment only, or perform both functions simultaneously. In addition, the invention can be readily configured to spray the liquid treatment material from one or the other sides, or both, of the apparatus. Further, the invention contemplates that two different liquid treatment materials can be sprayed. Also, the invention contemplates that from one to two hand operated spray wands may be available for use in close-in detailing.

Use of the apparatus described above will now be briefly summarized. Once the motor 26 is started and the centrifugal clutch engaged, the drive wheels 28 will push the apparatus 2 across the surface to be treated, e.g., a lawn. When it is desired to spread granular material, the control lever 74 is operated to open the cover at the bottom of the granular storage compartment 4 and the granular material falls by gravity to the platter 34. Because the platter 34 is spinning, the ribs 40 act to throw the material in a radially outward direction. At the time that it is desired to spray liquid treatment material, either one or both of the valve actuation controls 76 are engaged to open the valve 66 for communication through the second outlet 56 of the manifold 50 to the outlet hose 70. Due to the peristaltic action imparted to the pump hose 48, liquid is pumped from the liquid tank 14 through the hose 70 to the spray nozzle 68 and spray head 100.

When it is desired to perform close-in detailing using the spray wand 62, it may be desirable to stop the granular spreading and liquid spraying for reasons both of economy and to ensure that particular portions of the lawn are not over-treated. Accordingly, the control lever 74 is operated to close the cover at the bottom of the compartment 4 and the valve actuation controls 76 are manipulated to close the valves 66. Thereafter, the apparatus is tilted so that the drive wheels 28 do not contact the ground (the center of gravity of the apparatus 2 being such that the wheels 28 can be lifted off of the ground while the apparatus is balanced on the wheels 12) and the spray wand 62 is removed from its carrying location. Actuation of the hand valve 60 causes liquid treatment material to flow to and through the spray discharge nozzle 64 of the spray wand 62. Upon completion of the close-in detailing, the hand valve 60 is disengaged and the wand 62 is returned to its carrying location. Drive wheels 28 are again placed in contact with the ground and further treatment operations can occur as described above. Of course, the use of the spray wand 62 is not restricted to the time when the apparatus 2 is stationary. Rather, because the wand 62 is under liquid pressure when the apparatus is used, it is possible to operate the wand 62 as the apparatus traverses a treatment area.

While the invention described thus far has been directed to a complete apparatus, including the chassis frame, granular storage compartment, motor, platter, wheels, etc., the invention also contemplates that certain components can be retrofit onto existing granular spreaders. For example, Lakeshore Equipment & Supply Company, Elyria, Ohio, sells several different granular spreaders under the designation LESCO Spreader, LESCO Hi-Wheel Spreader and LESCO Gasoline-Powdered Hydraulic-Driven Spreader. These units include generally a chassis frame, a granular storage compartment, one pair of wheels (which may or may not be motor powered), a handle, a lever to control the opening and closing of a trap door located at the bottom of the storage compartment, and a spinning platter to throw the granular material outwardly. Thus, with spreaders such as these, certain components of the present invention can be retrofit. For example, the motor 26, drive wheels 28, liquid tank 14, supply hose 44, pump hose 48, manifold 50, pump rollers 52, valve 66, valve actuation control 76, outlet hose 70, flexible hose 58, spray wand 62, spray discharge nozzle 64, splitter valve 92, extension tubes 94, and spray nozzle 68 can be mounted on such units in the manner discussed above in relation to, for example, FIGS. 1-6, to provide all of the advantages described herein. Accordingly, these and related retrofit components also form a part of the present invention.

What is claimed is:

1. A self-propelled granular and liquid material spreader, comprising:

a chassis frame having a leading edge, a trailing edge and opposed sides, a first pair of wheels attached to said frame adjacent the leading edge thereof, each of said wheels being in spaced apart relation and having a first axle therebetween, a granular storage compartment mounted to said frame, said compartment having a top portion, a bottom portion, and opposed side walls, said top portion being provided with an opening therein through which the granular material may be delivered, said bottom portion forming an angled trough and being provided with an opening and a movable cover disposed therebelow, said bottom portion extending below a plane formed by said opposed sides of said chassis frame and said top portion extending above the plane formed by said opposed sides of said chassis frame, a liquid storage tank mounted adjacent said granular storage and positioned forward of said leading edge of said chassis frame, said tank having a filling opening near the top thereof and a hose connector near the bottom thereof, a second pair of wheels attached to said chassis frame adjacent the trailing edge thereof, each of said wheels being in spaced apart relation and having a second axle therebetween, at least one of said second pair of wheels having at least one roller positioned generally parallel to and radially outwardly from said second axle, a mounting bracket attached to said trailing edge of said chassis frame, said mounting bracket adapted to carry a motor, said motor operably connected to said second pair of wheels through said second axle, a handle attached to said trailing edge of said chassis frame, said handle extending angularly upward with respect to a plane formed by said opposed sides of said chassis frame, said handle equipped with grips, a granular activation control attached to said handle, said control operably connected to said movable cover of said bottom portion of said storage compartment to permit said cover to be moved from a closed position to an open position and back, a rotatable disc positioned on a rotatable shaft, one end of said rotatable shaft connected to said first axle through a gear arrangement and the other end of said rotatable shaft connected to said bottom portion of said storage compartment, said rotatable disc having a plurality of ribs positioned on the surface thereof nearest said bottom portion of said storage compartment, said rotatable disc being aligned to receive granular material that falls through said opening of said bottom portion of said storage compartment when said cover is in the open position, a flexible pump hose, one end of which is connected to a hose fitting and the other end of which is attached to an inlet of a manifold, said pump hose positioned to be peristaltically contacted by said at least one roller on said at least one of said second pair of wheels, said manifold also having a first outlet, a second outlet, and a first valve in line with said second outlet, a supply hose communicating with said liquid tank, through said hose connector, and with said inlet of said manifold through said hose fitting and said pump hose, a flexible hose, one end of which communicates with said first outlet of said manifold and the other end of which is connected to a second valve carried on a hand manipulated spray wand, said spray wand having a spray nozzle on the leading end thereof, said spray wand removably attached to said handle, an outlet hose, one end of which communicates with said second outlet of said manifold and the other end of which is connected to a splitter valve, said splitter valve having at least one outlet port in communication with an area spray nozzle having a spray head, said area spray nozzle being carried forward of said rotatable disc, a motor controller and a valve actuation control attached to said handle, said motor controller communicating with said motor to control the speed thereof, and said valve actuation control communicating with said first valve of said manifold to control the operation thereof.

2. The apparatus of claim 1, wherein said at least one roller comprises a plurality of rollers positioned generally parallel to and radially outwardly from said second axle and wherein said flexible pump hose is positioned to be peristaltically contacted by said plurality of rollers.

3. The apparatus of claim 1, wherein said at least one roller comprises a shaft having a removable rotatable sleeve thereon and wherein said flexible pump hose is positioned to be peristaltically contacted by said rotatable sleeve.

4. The apparatus of claim 1, wherein said at least one roller comprises a plurality of shafts positioned generally parallel to and radially outwardly from said second axle, each of said shafts having a removable rotatable sleeve thereon and wherein said flexible pump hose is positioned to be peristaltically contacted by said rotatable sleeve.

5. The apparatus of claim 1, wherein said splitter valve includes a first outlet port and a second outlet port, said first outlet port communicating with a first area spray nozzle, said first area spray nozzle being carried forward of said rotatable disc, said second outlet port communicating with a second area spray nozzle, said second area spray nozzle being carried forward of said rotatable disc.

6. The apparatus of claim 5, wherein, said first area spray nozzle and said second area spray nozzle are in spaced apart relation and positioned on opposed sides of said granular storage compartment.

7. The apparatus of claim 1, wherein said handle further includes a carrying bracket on which said valve actuation control, said motor controller, and said granular activation control are carried.

8. The apparatus of claim 1, wherein said area spray nozzle further includes an adjustable control valve to control the flow of liquid through said nozzle.

9. The apparatus of claim 5, wherein each of said first area spray nozzle and said second area spray nozzle further includes an adjustable control valve to control the flow of liquid through each of said nozzles.

10. The apparatus of claims 5 or 6 wherein said first area spray nozzle comprises two spray nozzles and said second area spray nozzle comprises two spray nozzles.

11. The apparatus of claim 1, wherein said motor is operably connected to said second axle through a transmission and clutch assembly.

12. A self-propelled granular and liquid material spreader, comprising:
   a chassis frame having a leading edge, a trailing edge and opposed sides,
   a first pair of wheels attached to said frame adjacent the leading edge thereof, each of said wheels being in spaced apart relation and having a first axle therebetween,
   a granular storage compartment mounted to said frame, said compartment having a top portion, a bottom portion, and opposed side walls, said top portion being provided with an opening therein through which the granular material may be delivered, said bottom portion forming an angled trough and being provided with an opening and a movable cover disposed therebelow, said bottom portion extending below a plane formed by said opposed sides of said chassis frame and said portion extending above the plane formed by said opposed sides of said chassis frame,
   a liquid storage tank mounted adjacent said granular storage and positioned forward of said leading edge of said chassis frame, said tank having a filling opening near the top thereof and a first hose connector and a second hose connector near the bottom thereof,
   a second pair of wheels attached to said chassis frame adjacent the trailing edge thereof, each of said wheels being in spaced apart relation and having a second axle therebetween, each of said second pair of wheels having at least one roller positioned generally parallel to and radially outwardly from said second axle, a mounting bracket attached to said trailing edge of said chassis frame, said mounting bracket adapted to carry a motor, said motor operably connected to said second pair of wheels through said second axle,
   a handle attached to said trailing edge of said chassis frame, said handle extending angularly upward with respect to a plane formed by said opposed sides of said chassis frame, said handle equipped with grips,
   a granular activation control attached to said handle, said control operably connected to said movable cover of said bottom portion of said storage compartment to permit said cover to be moved from a closed position to an open position and back,
   a rotatable disc positioned on a rotatable shaft, one end of said rotatable shaft connected to said first axle through a gear arrangement and the other end of said rotatable shaft connected to said bottom portion of said storage compartment, said rotatable disc having a plurality of ribs positioned on the surface thereof nearest said bottom portion of said, storage compartment, said rotatable disc being aligned to receive granular material that falls through said opening of said bottom portion of said storage compartment when said cover is in the open position,
   a first flexible pump hose, one end of which is connected to a first hose fitting and the other end of which is attached to an inlet of a first manifold, said first pump hose positioned to be peristaltically contacted by said at least one roller on one of said second pair of wheels, said first manifold also having a first outlet, a second outlet, and a first valve in line with said second outlet,
   a second flexible pump hose, one end of which is connected to a second hose fitting and the other end of which is attached to an inlet of a second manifold, said second pump hose positioned to be peristaltically contacted by said at least one roller on the other of said second pair of wheels, said second manifold also having a first outlet port, a second outlet port, and a manifold valve in line with said second outlet port,
   a first supply hose communicating with said liquid tank, through said first hose connector, and with said inlet of said first manifold through said first hose fitting and said first pump hose,
   a second supply hose communicating with said liquid tank, through said second hose connector, and with said inlet of said second manifold through said second hose fitting and said second pump hose,
   a flexible hose, one end of which communicates with said first outlet of said first manifold and the other end of which is connected to a second valve carried on a hand manipulated spray wand, said spray wand having a spray nozzle on the leading end thereof, said spray wand removably attached to said handle, a first outlet hose, one end of which communicates with said second outlet of said first manifold and the other end of which is connected to a first splitter valve, said first splitter valve having at least one outlet port in communication with a first area spray nozzle having a spray head, said first area spray nozzle being carried forward of said rotatable disc, a second outlet hose, one end of which communicates with said second outlet port of said second manifold and the other end of which is connected to said first splitter valve, said first splitter valve having at least one outlet port in communication with a second area spray nozzle having a spray head, said second area spray nozzle being carried forward of said rotatable disc, a motor controller, a first valve actuation control and a second valve actuation control attached to said handle, said motor controller communicating with said motor to control the speed thereof, and said first valve actuation control communicating with said first valve of said first manifold to control the operation thereof and said second valve actuation control communicating with said manifold valve of said second manifold to control the operation thereof.

13. The apparatus of claim 12, wherein said at least one roller of each of said second pair of wheels comprises a plurality of rollers positioned generally parallel to and radially outwardly from said axle and wherein said first flexible pump hose is positioned to be peristaltically contacted by said plurality of rollers of one of said wheels and said second flexible pump hose is positioned to be peristaltically contacted by said plurality of rollers of the other of said wheels.

14. The apparatus of claim 12, wherein said at least one roller comprises a shaft having a removable rotatable sleeve thereon and wherein said flexible pump hose is positioned to be peristaltically contacted by said rotatable sleeve.

15. The apparatus of claim 12, wherein said at least one roller of each of said second pair of wheels comprises a plurality of shafts positioned generally parallel to and radially outwardly from said axle, each of said shafts having a removable rotatable sleeve thereon and wherein said first flexible pump hose is positioned to be peristaltically contacted by said rotatable sleeve of said plurality of said shafts of one of said wheels and said second flexible pump hose is positioned to be peristaltically contacted by said rotatable sleeve of said plurality of said shafts of the other of said wheels.

16. The apparatus of claim 12, wherein said handle further includes a carrying bracket on which said first valve actuation control, said second valve actuation control, said motor controller, and said granular activation control are carried.

17. The apparatus of claim 12, wherein said liquid storage-tank includes a first compartment communicating with said first hose connector and a second compartment communicating with said second hose connector.

18. The apparatus of claim 12, wherein each of said first area spray nozzle and said second area spray nozzle further includes an adjustable control valve to control the flow of liquid through each of said nozzles.

19. The apparatus of claim 12, wherein one end said second outlet hose communicates with said second outlet port of said second manifold and the other end of which is connected to a second splitter valve having at least one outlet port in communication with said second area spray nozzle.

20. The apparatus of claim 12, wherein, said first area spray nozzle and said second area spray nozzle are in spaced apart relation and positioned on opposed sides of said granular storage compartment.

21. The apparatus of claims 12 or 20 wherein said first area spray nozzle comprises two spray nozzles and said second area spray nozzle comprises two spray nozzles.

22. The apparatus of claim 12 wherein said motor is operably connected to said second axle through a transmission and clutch assembly.

23. In a material spreader, having a chassis frame with a leading edge, a trailing edge and opposed sides, a first pair of wheels attached to the frame adjacent the leading edge thereof, each of the wheels being in spaced apart relation and having a first axle therebetween, a granular storage compartment mounted to the frame, the storage compartment having a top portion, a bottom portion, and opposed side walls, with the top portion being provided with an opening therein through which the granular material may be delivered, and the bottom portion of the compartment forming an angled trough and being provided with an opening and a movable cover disposed therebelow, the bottom portion extending below a plane formed by the opposed sides of the chassis frame and the top portion extending above the plane formed by the opposed sides of the chassis frame, a handle attached to the trailing edge of the chassis frame, with the handle extending angularly upward with respect to a plane formed by the opposed sides of the chassis frame, the handle being equipped with grips, a granular activation control attached to the handle, with the control operably connected to the movable cover of the bottom portion of the storage compartment to permit the cover to be moved from a closed position to an open position and back, a rotatable disc positioned on a rotatable shaft, one end of the rotatable shaft connected to the first axle through a gear arrangement and the other end of the rotatable shaft connected to the bottom portion of the storage compartment, the rotatable disc having a plurality of ribs positioned on the surface thereof nearest the bottom portion of the storage compartment, the rotatable disc being aligned to receive granular material that falls through the opening of the bottom portion of the storage compartment when the cover is in the open position, the improvement comprising a retrofit package comprising:

a liquid storage tank and a hose connector, said liquid storage tank to be mounted adjacent the granular storage compartment and positioned forward of the leading edge of the chassis frame, said tank having a filling opening near the top thereof with said hose connector to be attached to said liquid tank near the bottom thereof, a second pair of wheels and a second axle, with said second pair of wheels to be attached to the chassis frame adjacent to and below the trailing edge thereof, each of said wheels adapted to be in spaced apart relation with said second axle therebetween, at least one of said second pair of wheels being provided with at least one roller positioned generally parallel to and radially outwardly from said second axle, a mounting bracket and a motor, said mounting bracket to be attached to the trailing edge of the chassis frame, said mounting bracket adapted to carry said motor, said motor to be operably connected to said second pair of wheels through said second axle, a flexible pump hose, a hose fitting and a manifold, with one end of said flexible pump hose to be connected to said hose fitting and the other end of which to be attached to an inlet of said manifold, said pump hose to be positioned to be peristaltically contacted by said at least one roller on said at least one of said second pair of wheels, said manifold also having a first outlet, a second outlet, and a first valve in line with said second outlet, a supply hose to communicate with said liquid tank, through said hose connector, and with said inlet of said manifold through said hose fitting and said pump hose, a flexible hose, a second valve, a hand manipulated spray wand and a spray nozzle, one end said flexible hose to communicate with said first outlet of said manifold and the other end of which to communicate with said second valve carried on said hand manipulated spray wand, said spray wand having said spray nozzle on the leading end thereof, said spray wand to be removably attached to the handle, an outlet hose, a splitter valve, an area spray nozzle, and a spray head, one end of said outlet hose to communicate with said second outlet of said manifold and the other end of which to be connected to said splitter valve, said splitter valve having at least one outlet port to communicate with said spray head carried on said area spray nozzle, said area spray nozzle to be carried forward of the rotatable disc, a motor controller to communicate with said motor to control the speed thereof, and a valve actuation control to communicate with said first valve of said manifold to control the operation thereof.

24. In a material spreader, having a chassis frame with a leading edge, a trailing edge and opposed sides, a first pair of wheels attached to the frame adjacent the leading edge thereof, each of the wheels being in spaced apart relation and having a first axle therebetween, a granular storage compartment mounted to the frame, the storage compartment having a top portion, a bottom portion, and opposed side walls, with the top portion being provided with an opening therein through which the granular material may be delivered, and the bottom portion of the compartment forming an angled trough and being provided with an opening and a movable cover disposed therebelow, the bottom portion extending below a plane formed by the opposed sides of the chassis frame and the top portion extending above the plane formed by the opposed sides of the chassis frame, a handle attached to the trailing edge of the chassis frame, with the handle extending angularly upward with respect to a plane formed by the opposed sides of the chassis frame, the handle being equipped with grips, a granular activation control attached to the handle, with the control operably connected to the movable cover of the bottom portion of the storage compartment to permit the cover to be moved from a closed position to an open position and back, a rotatable disc positioned on a rotatable shaft, one end of the rotatable shaft connected to the first axle through a gear arrangement and the other end of the rotatable shaft connected to the bottom portion of the storage compartment, the rotatable disc having a plurality of ribs positioned on the surface thereof nearest the bottom portion of the storage compartment, the rotatable disc being aligned to receive granular material that falls through the opening of the bottom portion of the storage compartment when the cover is in the open position, the improvement comprising a retrofit package comprising:

a liquid storage tank and a hose connector, said liquid storage tank to be mounted adjacent the granular storage compartment and positioned forward of the leading edge of the chassis frame, said tank having a filling opening near the top thereof with said hose connector to be attached to said liquid tank near the bottom thereof, a second pair of wheels and a second axle, with said second pair of wheels to be attached to the chassis frame adjacent to and below the trailing edge thereof, each of said wheels adapted to be in spaced apart relation with said second axle therebetween, at least one of said second pair of wheels being provided with at least one roller positioned generally parallel to and radially outwardly from said second axle, a mounting bracket and a motor, said mounting bracket to be attached to the trailing edge of the chassis frame, said mounting bracket adapted to carry said motor, said motor to be operably connected to said second pair of wheels through said second axle, a first flexible pump hose, a first hose fitting and a first manifold, with one end of said first flexible pump hose to be connected to said first hose fitting and the other end of which to be attached to an inlet of said first manifold, said first pump hose to be positioned to be peristaltically contacted by said at least one roller on said at least one of said second pair of wheels, said first manifold also having a first outlet, a second outlet, and a first valve in line with said second outlet, a second flexible pump hose, a second hose fitting and a second manifold, with one end of said second flexible pump hose to be connected to said second hose fitting and the other end of which to be attached to an inlet of said second manifold, said second pump hose to be positioned to be peristaltically contacted by said at least one roller on the other of said at least one of said second pair of wheels, said second manifold also having a first outlet port, a second outlet port, and a manifold valve in line with said second outlet port, a first supply hose to communicate with said liquid tank, through said first hose connector, and with said inlet of said first manifold through said first hose fitting and said first pump hose, a second supply hose to communicate with said liquid tank, through said second hose connector, and with said inlet of said second manifold through said second hose fitting and said second pump hose, a flexible hose, a second valve, a hand manipulated spray wand and a spray nozzle, one end said flexible hose to communicate with said first outlet of said first manifold and the other end of which to communicate with said second valve carried on said hand manipulated spray wand, said spray wand having said spray nozzle on the leading end thereof, said spray wand to be removably attached to the handle, a first outlet hose, a first splitter valve, a first area spray nozzle, and a first spray head, one end of said first outlet hose to communicate with said second outlet of said first manifold and the other end of which to be connected to said first splitter valve, said first splitter valve having at least one outlet port to communicate with said first spray head carried on said first area spray nozzle, said first area spray nozzle to be carried forward of the rotatable disc, a second outlet hose, a second area spray nozzle, and a second spray head, one end of said second outlet hose to communicate with said second outlet of said second manifold and the other end of which to be connected to said first splitter valve, said first splitter valve having at least one outlet port to communicate with said second spray head carried on said second area spray nozzle, said second area spray nozzle to be carried forward of the rotatable disc, a motor controller to be attached to the handle, said motor controller to communicate with said motor to control the speed thereof, a first valve actuation control to communicate with said first valve of said first manifold to control the operation thereof, and a second valve actuation control to communicate with said manifold valve of said second manifold to control the operation thereof.

25. The apparatus of claim 24, further including a second splitter valve and wherein one end of said second outlet hose is to communicate with said second outlet port of said second manifold and the other end of which is to be connected to said second splitter valve, said second splitter valve having at least one outlet port to communicate with said second area spray nozzle.

* * * * *